United States Patent [19]

Crothers

[11] 4,381,697
[45] May 3, 1983

[54] APPARATUS TO MAKE COOKIES

[75] Inventor: William G. Crothers, Princeton, N.J.

[73] Assignee: Deer Park Baking Co., Hammonton, N.J.

[21] Appl. No.: 228,292

[22] Filed: Jan. 26, 1981

[51] Int. Cl.³ .......................... A47J 37/00; A21B 3/07
[52] U.S. Cl. .................................. 99/353; 99/443 C; 425/362
[58] Field of Search .............. 99/353, 443 C; 425/362, 425/436 R, 220, 436 RM; 198/611, 612, 576, 834; 426/496, 512

[56] References Cited

U.S. PATENT DOCUMENTS 1,971,087  8/1934  Werner .............................. 425/362
2,167,388  7/1939  Kremmling .................... 425/362 X
3,318,264  5/1967  Weidenmiller ..................... 425/362
4,229,487 10/1980  Crothers .......................... 99/353 X Primary Examiner—Billy J. Wilhite
Attorney, Agent, or Firm—Stephen E. Feldman; Marvin Feldman; Jules L. Chaboty

[57] ABSTRACT

An apparatus to make cookies which consists of a drum shaped device known as a die roll for shaping the cookies. The drum shaped die roll receives dough from a feed hopper and deposits the shaped dough on the surface of a transfer conveyor at a first location. The drum is provided with knurls on its outside surface which ensure a positive drive to the transfer conveyor. The transfer conveyor then moves the shaped dough to a second location which is adjacent to an oven conveyor. The oven conveyor receives the shaped dough at the second location and carries the shaped dough into an oven for baking into cookies or cookie bits.

10 Claims, 4 Drawing Figures

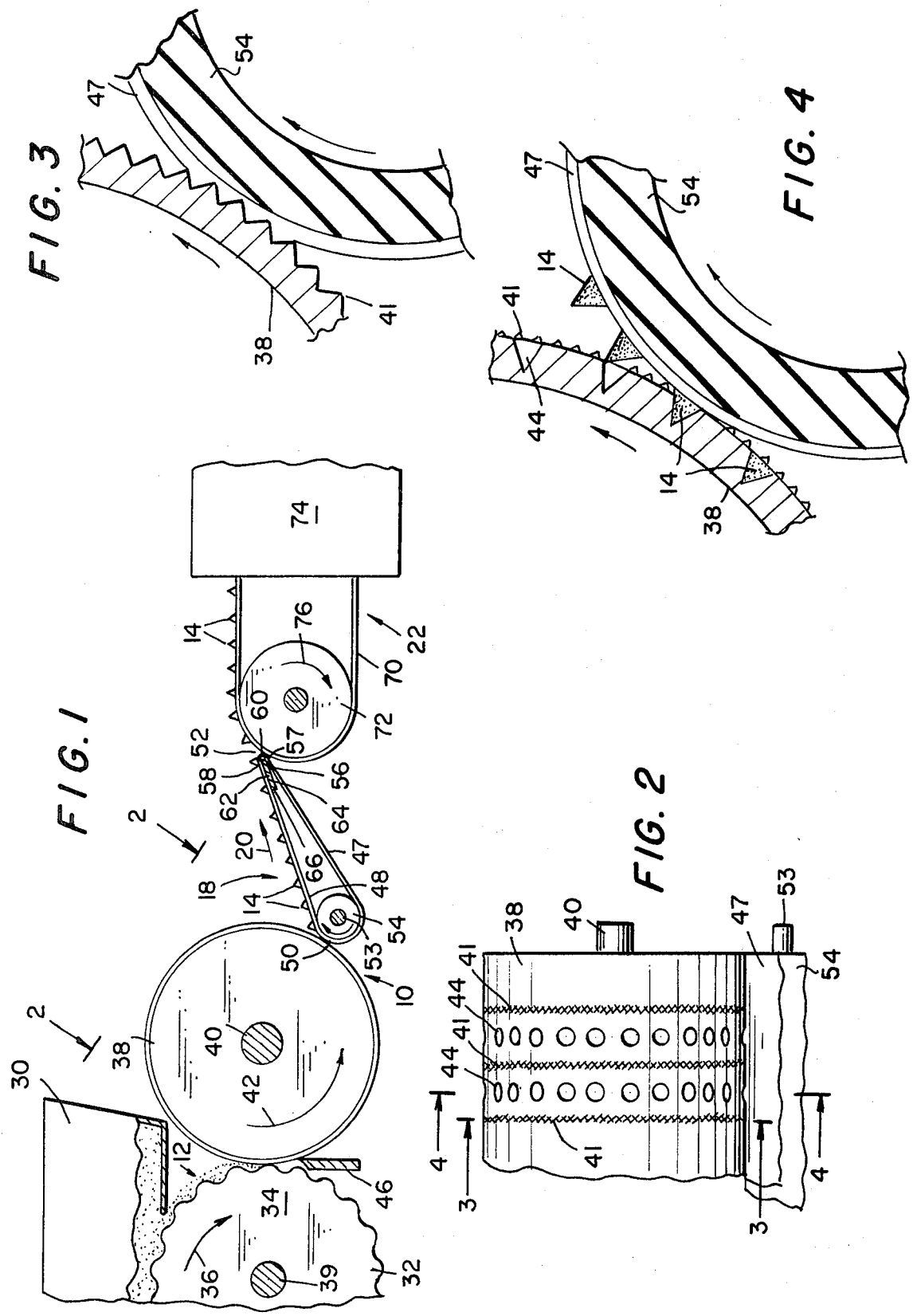

4,381,697

APPARATUS TO MAKE COOKIES

FIELD OF THE INVENTION

This invention relates to making cookies. Specifically this invention relates to an apparatus for making cookies.

BACKGROUND OF THE INVENTION

While the invention is subject to a wide range of applications, it is especially suited to use in an apparatus to make cookies and will be particularly described in that connection.

In the past, a number of machines have been used to form cookies in a desired shape by the use of a rotary die drum. The shaped cookies are then transferred to a conveyor belt which then carries the cookies into an oven. In some cases the conveyor belt adjacent the rotary die drum is driven by frictional contact with the rotary die drum. Generally the surface of the rotary die drum is polished and that makes a positive frictional drive difficult.

For example, my U.S. Pat. No. 4,229,487 issued Oct. 21, 1980 is directed to an apparatus for making cookies wherein a rotary die drum is in frictional contact with a conveyor. This conveyor is driven by the contact with the die drum. A highly polished surface on the outside of the rotary die drum makes positive drive to the conveyor a maintenance problem during machine operation.

U.S. Pat. No. 1,971,087 to Werner discloses a cookie machine wherein a canvas belt 21 is wrapped approximately halfway around a drum 12 in order to provide maximum frictional contact between belt 21 and drum 12. In the aforedescribed arrangement the extensive contact between belt 21 and drum 12 cannot be attained in all machine design situations nor is it desirable.

U.S. Pat. No. 2,167,338 to Kremmling discloses a biscuit molding machine having a drum 2 being driven by take-off belt 8. In this disclosure take off belt 8 is shown making contact with about one third of the drum 2 surface. This extensive contact between belt 8 and drum 2 ensures positive drive between the two but still has the disadvantage of requiring extensive contact between belt 8 and drum 12.

U.S. Pat. No. 3,318,264 to Weidenmiller discloses a die roll 28 which is in contact with delivery belt 30 and apparently drives belt 30. In this patent and in the immediately aforedescribed patents relatively extensive contact is shown as necessary between die roll 28 and belt 32 for reliable mechanical drive.

Accordingly, it is an object of the present invention to provide an improved rotary die roll to transfer conveyor drive;

It is a further object of the present invention to provide a relatively uncomplicated rotary die roll to transfer conveyor drive and therefore, inexpensive to manufacture.

SUMMARY OF THE INVENTION

Accordingly there has been provided an improved apparatus to make cookies comprising a die roll having cavities for shaping the cookies. A feed hopper is disposed above and to the side for feeding dough to the die roll which shapes the dough bits. The shaped dough bits are then deposited onto a transfer conveyor proximate the die roll for transfer to another location. The roll is provided with knurls between the cavities in order to ensure a positive drive to the transfer conveyor. The transfer conveyor moves the shaped dough upwardly from a first location to an oven conveyor at a second location for baking the shaped dough into cookies.

For a better understanding of the present invention, together with other and further objects thereof, reference is had to the following description taken in connection with the accompanying drawings, while its scope will be pointed out in the appended claims.

BRIEF DESCRIPTION OF THE DRAWINGS

FIG. 1 is a side view of the apparatus to make cookies in accordance with the present invention;

FIG. 2 is a fragmentary view of the apparatus of FIG. 1 in the direction of arrows 2—2;

FIG. 3 is a fragmentary cross section of the die roll of FIG. 2 in the direction of arrows 3—3;

FIG. 4 is a fragmentary cross section of the die roller FIG. 2 in the direction of arrows 4—4.

DESCRIPTION OF THE PREFERRED EMBODIMENT

An improved apparatus for making cookies 10 comprises a dough transfer device 12 for filling the cavities of die roll 38 so as to form dough bits of a configuration 14. The die roll 38 deposits the formed dough 14 onto transfer surface 48 of transfer conveyor 18. Transfer conveyor 18 moves the formed dough 14 from first location 50 to a second location 52 where the dough bits 14 are transfered to an oven conveyor 22 for baking to form cookies.

Referring to FIG. 1, an improved apparatus to make cookies 10 comprises a dough transfer device 12 which forces dough into the cavities of die roll 38 to form the dough bits of the desired configuration. The term "cookie" refers to the dough after it has been baked. For the purposes of this disclosure the term will be shaped dough or dough bits for the unbaked dough.

The improved apparatus to make cookies 10 consists of a hopper 30 which contains the mass of dough to be shaped into dough bits. The dough transfer device 12 is comprised of a feed roll 32 which is cylindrical in shape and has a corrugated metal 34 mounted on its periphery. The feed roll 32 is located below the hopper 30 and picks up dough from hopper 30 which sticks to the corrugated metal 34 and is carried in the direction shown by an arrow 36.

The outside diameter of feed roll 32 makes contact with a die roll 38. The outside surface of die roll 38 is provided with a plurality of conically shaped cavities 44 and a plurality of knurled surfaces 41 best seen in FIG. 2. Feed roll 32 is mounted on a first shaft 39 and die roll 38 is mounted on a second shaft 40 so that when feed roll 32 moves in the direction of arrow 36, die roll 32 moves in the direction of an arrow 42. There is a positive drive connection between feed roll 32 and die roll 38 so that they move together when powered by drive means not shown.

Die roll 38 is generally made in the form of a cylindrical die plate of highly polished metal so that the dough forced into the cavities 44 by feed roll 32 can be later extracted. It is preferable, in the present invention, to coat the interior of cavities 44 with teflon to prevent the dough from sticking within the cavities. The teflon has a lower coefficient of friction than the highly polished surface and is required in the present design because of the large amount of dough which contacts the walls of the conically shaped cavities 44. Immediately adjacent to die roll 38 is a doctor blade 46 which acts to strip all excess dough remaining outside the cavities 44.

A transfer conveyor 18 includes an endless conveyor belt 47 which is in contact with die roll 38 at a first location 50. Conveyor belt 47 has a transfer surface 48 which is herein considered a portion of the endless conveyor belt 47. Further, transfer surface 48 extends between first location 50 where a dough bit 14 is received on the transfer surface 48 to a second location 52 where the dough bit 14 is removed from the transfer surface.

The support for endless conveyor belt 47 consists of a first rotating drum 54 at the first location 50 and a nose bar 56 at the second location 52. The first drum 54 having a third shaft 53 may be made of a resilient material, such as rubber so that a continual pressure can be exerted by drum 54 against conveyor belt 47 and against die roll 38. Conveyor belt 47 is preferably canvas and it is pressed into contact with the plurality of knurled surfaces 41 by drum 54 thereby ensuring a positive no slip drive from die roll 38 to conveyor belt 47.

Nose bar 56 is shown to have a knife like edge 57 formed by a first surface 58 and a second surface 64 contacting each other. Conveyor 47 is wrapped around the knife like edge 57 and makes sliding contact with nose bar 56. The nose bar 56 further consists of a flat surface 62 parallel to second surface 64 and an end surface 66 perpendicular to second surface 64. The nose bar 56 is fixed to the body of the machine 10 and is not movable except for occasional operating adjustments. The angle the transfer surface 48 makes with the horizontal is approximately 15 to 25 degrees and is a preferable operating arrangement. Although the nose bar 56 is preferably formed as shown in the embodiment as described, it is within the scope of the present invention to provide any desired shape nose bar such as a thin rod or thin plate. The important consideration for the nose bar 56 is that a sharp edge surface be adjacent an oven conveyor 22 whereby the dough bit can be transferred from transfer surface 48 to oven conveyor 22 while dough bit 14 remains upright during transfer.

Oven conveyor 22 consists of an endless oven conveyor belt 70 which is supported on a second rotating drum 72 and another rotating drum of the same diameter (not shown). The oven conveyor belt 70 is preferably made of steel or other temperature resistant material since it is subject to oven temperatures as it enters an oven 74 where the dough bits 14 are baked. The oven conveyor belt 70 moves in the direction shown by arrow 76 and is caused to move by a motor means coupled to second rotating drum 72 (not shown).

FIG. 2 is a fragmentary view of the improved apparatus 10 in the direction of arrows 2—2. Here is seen die roll 38 with second shaft 40 protruding from its center. Further shown is endless conveyor belt 47 contacting the outside periphery of die roll 38 and first rotating drum 54 pressing belt 47 against the die roll 38. Drum 54 is shown with third shaft 53 protruding from its center. Most significant are the alternating rows of conical cavities 44 and knurls 41 on the periphery of die roll 38.

FIG. 3 shows a fragmentary view of section 3—3 on FIG. 2 viewed in the direction of the arrows. Section 3—3 is taken through the center of the knurl 41. The knurl shown in FIG. 2 consists of a diamond pattern which in section appear as saw teeth. Although the knurl illustrated is to be preferred, other patterns having elements above or below the periphery of die roll 38 can be used to practice this invention. Therefore, the surface of die roll 38 is shown in section in FIG. 3. Contacting the saw teeth surface of the knurl 41 is the canvas conveyor belt 47 which is supported by first rotating drum 54. The arrows near each element indicate the direction of rotation of the respective parts. Because of the pressure of first drum 54 against the canvas it is forced into the knurl 41. A result of the canvas being forced into the teeth of the knurl is that the die roll 38 and endless conveyor belt 47 are locked together ensuring that there is a positive no-slip drive between die roll 38 and endless conveyor belt 47.

FIG. 4 shows a fragmentary view of Section 4—4 on FIG. 2 viewed in the direction of the arrows. Section 4—4 is taken through the center of the plurality of cavities 44. Each of the cavities 44 is shown in the surface of die roll 38. First rotating drum 54 is shown pressing canvas conveyor belt 47 against the die roll 38. The arrows alongside the parts indicate their direction of movement. Consequently, the two cavities 44 which are labeled 14 are filled with dough and the canvas belt 47 is pressed into contact with the formed dough 14 which sticks to the canvas surface of belt 47. As belt 47 leaves the area of contact with die roll 38 it removes the formed dough 14 from the cavity 44. Since the cavities 44 are coated with teflon the sticking force between formed dough and cavity is less than the sticking force between the formed dough and the canvas belt, the knurl 41 can be seen just behind the section of FIG. 4. The elements of the knurl may be raised above the surface of die roll 38 as shown or may be formed below the surface if desired or can be a combination of both.

In order to more fully understand the present invention, a description of its operation follows. The improved apparatus to make cookies 10 operates by feed roll 32 receiving dough from the feed hopper 30 within the corrugated metal 34. The feed roll 32 moves in a clockwise direction and the dough caught in the corrugated metal 34 is pressed into the cavities 44 found in the surface of die roll 38 at the point of contact. As the cavities 44 move away from the point of contact the doctor blade 46 removes excess dough from the surface of die roll 38. Feed roll 32 and die roll 38 are mechanically connected so as rotate in unison.

When the die roll 38 passes into contact with endless conveyor belt 47 the first rotating drum 54 presses the belt 47 onto cavities 44 and into contact with the base of the dough in cavities 44. As die roll 38 rotates it causes endless conveyor belt 47 to move in the direction of an arrow 20. The plurality of knurled surfaces 41 pressed into contact with belt 47 by rotating drum 54 provides the positive mechanical force required by die roll 38 in order to reliably drive endless conveyor belt 47. When belt 47 contacts the base of the dough in cavities 44 the base adheres to the conveyor belt 47 and the dough is withdrawn from cavities 44 as the belt 47 separates from the die roll 38, the point of transfer is designated first location 50.

The cone shaped dough bits 14 are conveyed on transfer surface 48 to a second location 52 by endless conveyor belt 47. The dough bits 14 are caused to move against oven conveyor belt 70 by endless conveyor belt 47. The dough bits 14 are effectively peeled from endless conveyor belt 47 and pasted to oven conveyor belt 70. The uncooked dough is pasty before it hardens in the baking process. Oven conveyor belt 70 then carries shaped dough 14 into oven 74 for baking and subsequent use as required.

The aforedescribed improved apparatus to make cookies accurately produces cookies of a desired configuration and is relatively uncomplicated and therefore, inexpensive to manufacture and operate.

While there has been described what is at present considered to be the preferred embodiment of the invention, it will be obvious to those skilled in the art that various changes and modifications may be made therein, without departing from the invention, and it is therefore, aimed in the appended claims to cover all such changes and modifications as fall within the true spirit and scope of the invention.

What is claimed is:

1. An improved apparatus to make cookies comprising;
   a. dough bit shaping means having a first surface being formed with cavities recessed from said first surface for forming dough into individual dough bits, said dough bit shaping means being formed with a second surface disposed in a plane other than said first surface so as to form elements, which elements are disposed adjacent said cavities;
   b. transfer conveyor means being disposed adjacent said dough bit shaping means and having a transfer surface extending between a first location and a second location, said elements and said transfer surface being in contact so that said elements engage said transfer surface so that said dough bits are received from said dough bit shaping means onto said transfer surface and transferred to said second location where said dough bits are removed from said transfer surface; and
   c. oven means for receiving said dough bits from said transfer conveyor so as to bake said dough bits to make said cookies.

2. The apparatus as defined in claim 1, together with a first rotating drum, and further characterized in that said transfer conveyor means is pressingly engaged with said dough bit shaping means by said first rotating drum.

3. The apparatus as defined in claim 2, further characterized in that said first rotating drum is made of resilient material.

4. The apparatus as defined in claim 3, further characterized in that said dough bit shaping means drives said transfer conveyor means whereby said dough bits are carried from said first location to said second location.

5. The apparatus as defined in claim 4, further characterized in that said bit shaping means is a cylindrical die roll having a plurality of circumferentially disposed cavities for shaping said dough and a plurality of said elements circumferentially disposed on said cylindrical die roll between said cavities.

6. The apparatus as defined in claim 5, further characterized in that said cavities are cone-shaped whereby said cookies have a substantially conical configuration.

7. The apparatus as defined in claim 6, further characterized in that said elements are a diamond shaped knurl on said first surface.

8. The apparatus as defined in claim 7, further characterized in that said cavities are teflon coated so that said dough bits are easily removed from said cavities.

9. The apparatus as defined in claim 8, further characterized in that said transfer conveyor means is made of canvas.

10. The apparatus as defined in claim 9, further characterized in that said transfer conveyor means further comprises said first rotating drum at said first location and a nose bar at said second location.

* * * * *